(12) United States Patent
Sun et al.

(10) Patent No.: US 11,479,716 B2
(45) Date of Patent: Oct. 25, 2022

(54) LIGHT-MODULATING MATERIAL, LIGHT-MODULATING FILM, AND LIGHT-MODULATING LAMINATE

(71) Applicants: SEKISUI CHEMICAL CO., LTD., Osaka (JP); HIROSHIMA UNIVERSITY, Higashihiroshima (JP)

(72) Inventors: Rende Sun, Osaka (JP); Akira Nakasuga, Osaka (JP); Shoji Nozato, Osaka (JP); Keigo Oowashi, Osaka (JP); Hiroji Fukui, Osaka (JP); Takeharu Haino, Higashihiroshima (JP); Ryo Sekiya, Higashihiroshima (JP)

(73) Assignees: SEKISUI CHEMICAL CO., LTD., Osaka (JP); HIROSHIMA UNIVERSITY, Hiroshima (JP)

( * ) Notice: Subject to any disclaimer, the term of this patent is extended or adjusted under 35 U.S.C. 154(b) by 853 days.

(21) Appl. No.: 16/316,336

(22) PCT Filed: Jul. 21, 2017

(86) PCT No.: PCT/JP2017/026425
§ 371 (c)(1),
(2) Date: Jan. 8, 2019

(87) PCT Pub. No.: WO2018/016616
PCT Pub. Date: Jan. 25, 2018

(65) Prior Publication Data
US 2019/0292444 A1    Sep. 26, 2019

(30) Foreign Application Priority Data

Jul. 22, 2016 (JP) .............................. JP2016-144052

(51) Int. Cl.
*B32B 9/00* (2006.01)
*C09K 9/02* (2006.01)
(Continued)

(52) U.S. Cl.
CPC .................. *C09K 9/02* (2013.01); *B32B 7/05* (2019.01); *B32B 17/06* (2013.01); *C01B 32/194* (2017.08);
(Continued)

(58) Field of Classification Search
CPC ....... Y10T 428/30; B32B 9/007; B82Y 30/00; B82Y 40/00; H01B 4/00
(Continued)

(56) References Cited

U.S. PATENT DOCUMENTS 6,507,428 B1   1/2003  Heuer et al.
9,815,699 B1  11/2017  Zhang
(Continued)

FOREIGN PATENT DOCUMENTS

CN       104136369 A    11/2014
EP       2 851 341 A1    3/2015
(Continued)

OTHER PUBLICATIONS

Written Opinion of the International Searching Authority (PCT/ISA/237) for Application No. PCT/JP2017/026425 dated Oct. 10, 2017 (English Translation mailed Jan. 31, 2019).
(Continued)

*Primary Examiner* — Daniel H Miller
(74) *Attorney, Agent, or Firm* — Cheng Law Group, PLLC

(57) ABSTRACT

A light-modulating material of which the light transmittance can be controlled over a wide region from visible light to infrared light by voltage application is provided. The light-
(Continued)

modulating material comprises a graphene-like carbon material having an aspect ratio of 3 or more and 330 or less.

9 Claims, 4 Drawing Sheets

(51) Int. Cl.
| | |
|---|---|
| C01B 32/194 | (2017.01) |
| B32B 7/05 | (2019.01) |
| G02F 1/1516 | (2019.01) |
| B32B 17/06 | (2006.01) |
| E06B 3/67 | (2006.01) |
| E06B 9/24 | (2006.01) |
| B82Y 30/00 | (2011.01) |

(52) U.S. Cl.
CPC .............. *E06B 3/6722* (2013.01); *E06B 9/24* (2013.01); *G02F 1/1516* (2019.01); *B32B 2250/02* (2013.01); *B32B 2255/20* (2013.01); *B32B 2255/28* (2013.01); *B32B 2307/202* (2013.01); *B32B 2313/04* (2013.01); *B32B 2315/08* (2013.01); *B32B 2419/00* (2013.01); *B82Y 30/00* (2013.01); *C01B 2204/04* (2013.01); *C01B 2204/22* (2013.01); *C01P 2004/54* (2013.01); *C01P 2006/60* (2013.01); *C09K 2211/1018* (2013.01); *E06B 2009/2464* (2013.01); *Y10T 428/30* (2015.01)

(58) Field of Classification Search
USPC ........................................................ 428/408
See application file for complete search history.

(56) References Cited

U.S. PATENT DOCUMENTS

| | | |
|---|---|---|
| 2002/0196518 A1 | 12/2002 | Xu et al. |
| 2004/0143091 A1 | 7/2004 | Xu et al. |
| 2005/0157369 A1 | 7/2005 | Xu et al. |
| 2005/0200935 A1 | 9/2005 | Liu et al. |
| 2007/0177243 A1 | 8/2007 | Liu et al. |
| 2007/0188845 A1 | 8/2007 | Xu et al. |
| 2007/0268550 A1 | 11/2007 | Liu et al. |
| 2008/0055701 A1 | 3/2008 | Liu et al. |
| 2008/0170982 A1 | 7/2008 | Zhang et al. |
| 2009/0052002 A1 | 2/2009 | Xu et al. |
| 2009/0052006 A1 | 2/2009 | Xu et al. |
| 2009/0067030 A1 | 3/2009 | Liu et al. |
| 2009/0080056 A1 | 3/2009 | Yahara et al. |
| 2010/0038597 A1 | 2/2010 | Reynolds et al. |
| 2010/0324306 A1 | 12/2010 | Liu et al. |
| 2012/0098419 A1 | 4/2012 | Chiba et al. |
| 2013/0081678 A1 | 4/2013 | Naito et al. |
| 2015/0080513 A1 | 3/2015 | Wada et al. |
| 2015/0147573 A1 | 5/2015 | Zhang et al. |
| 2015/0308018 A1 | 10/2015 | Zhang et al. |
| 2016/0033839 A1* | 2/2016 | Lee .......................... C09K 9/02 359/268 |
| 2016/0060503 A1 | 3/2016 | Chakraborty et al. |
| 2016/0083872 A1 | 3/2016 | Zhang et al. |
| 2016/0251778 A1 | 9/2016 | Zhang et al. |
| 2016/0273133 A1 | 9/2016 | Zhang et al. |
| 2016/0312387 A1 | 10/2016 | Zhang et al. |
| 2017/0001866 A1 | 1/2017 | Zhang et al. |
| 2017/0096750 A1 | 4/2017 | Zhang et al. |
| 2017/0137290 A1 | 5/2017 | Zhang et al. |

FOREIGN PATENT DOCUMENTS

| | | |
|---|---|---|
| JP | 2002-526801 A | 8/2002 |
| JP | 2004-62030 A | 2/2004 |
| JP | 2004-531770 A | 10/2004 |
| JP | 2005-62772 A | 3/2005 |
| JP | 2010-515779 A | 5/2010 |
| JP | WO 2010/150619 A1 | 12/2010 |
| JP | 2012-224526 A | 11/2012 |
| JP | 2013-80565 A | 5/2013 |
| JP | 2015-134702 A | 7/2015 |
| JP | 2016-65358 A | 4/2016 |
| WO | WO-2007/061061 A1 | 5/2007 |

OTHER PUBLICATIONS

Li, Yizhuo et al., "Highly stable nanofluid based on polyhedral oligomeric silsesquioxane-decorated graphene oxide nanosheets and its enhanced electro-responsive behavior", Nanotechnology, 2016, vol. 27, No. 19, 195702 (11 pages).
Supplementary European Search Report for the Application No. EP 17 831 132.0 dated Jan. 8, 2020.
The First Office Action for the Application No. 201780027764.1 from The State Intellectual Property Office of the People's Republic of China dated May 11, 2021.
Shan, Changsheng et al., "Polyethyleneimine-functionalized graphene and its layer-by-layer assembly with Prussian blue", Thin Soiid Films, 2013, vol. 534, pp. 572-576.
International Search Report for the Application No. PCT/JP2017/026425 dated Oct. 10, 2017.
Written Opinion of the International Searching Authority (PCT/ISA/237) for Application No. PCT/JP2017/026425 dated Oct. 10, 2017.

* cited by examiner

[FIG. 1]
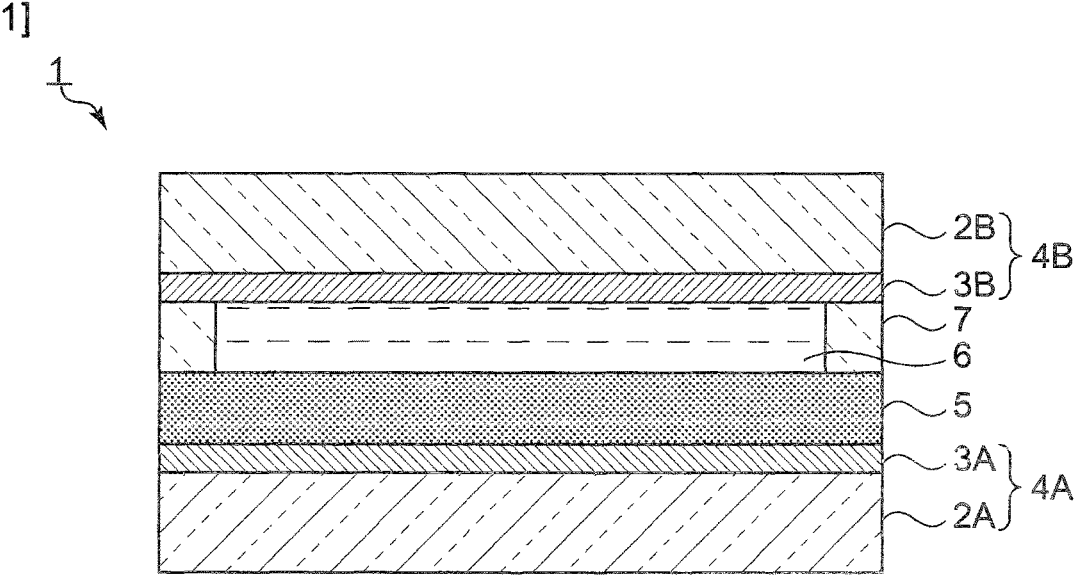

[FIG. 2]
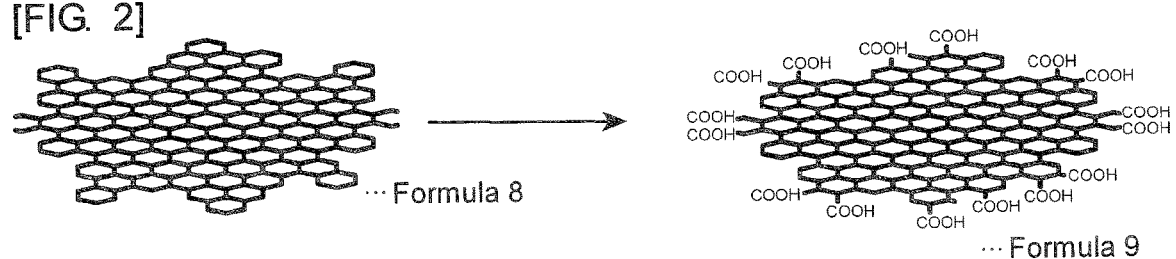
··· Formula 8    ··· Formula 9
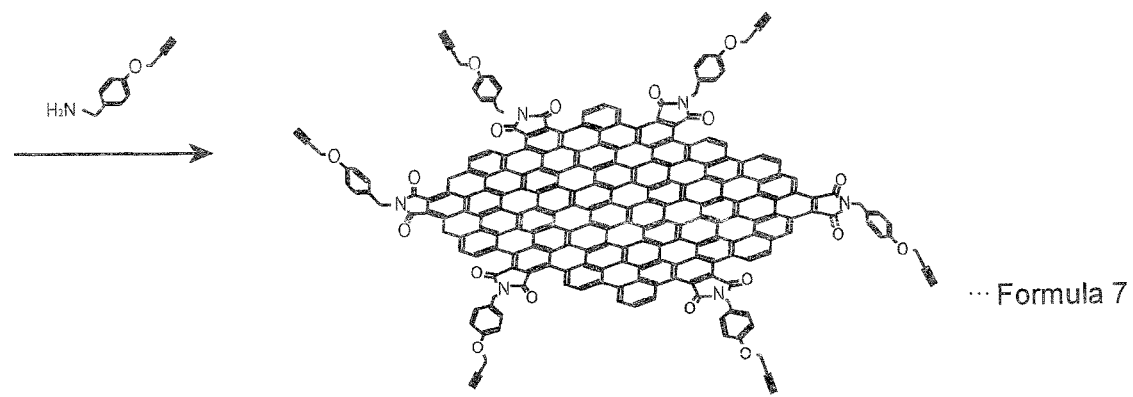
··· Formula 7
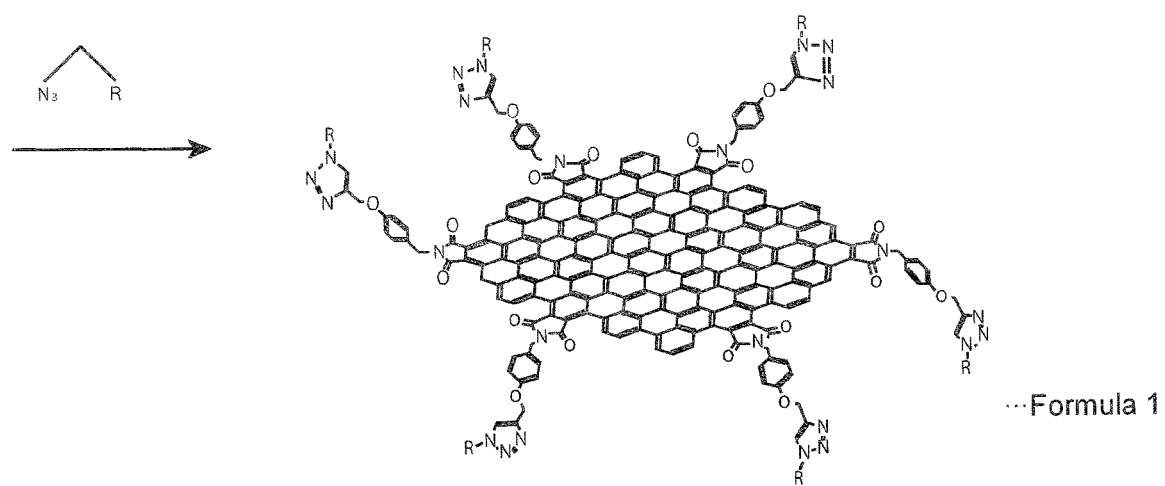
··· Formula 1

[FIG. 3]
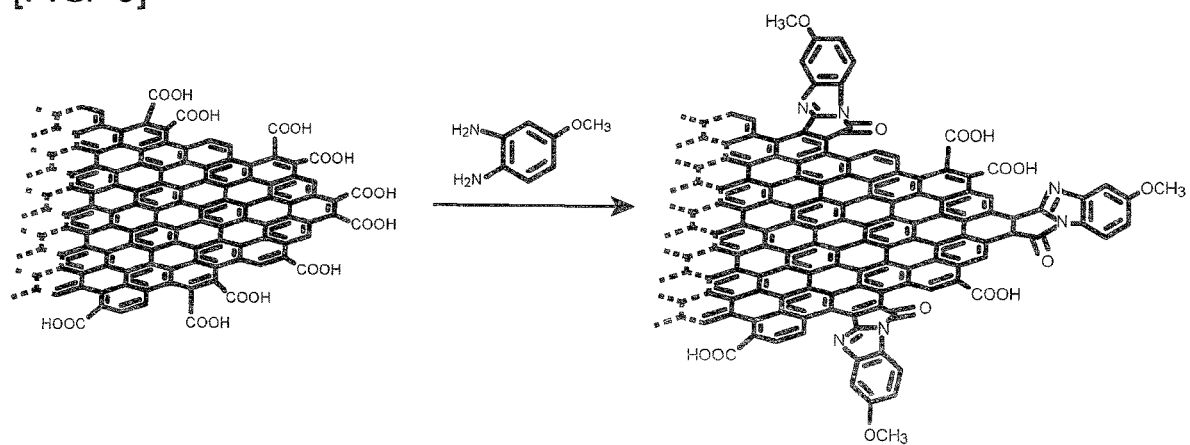
[FIG. 4]
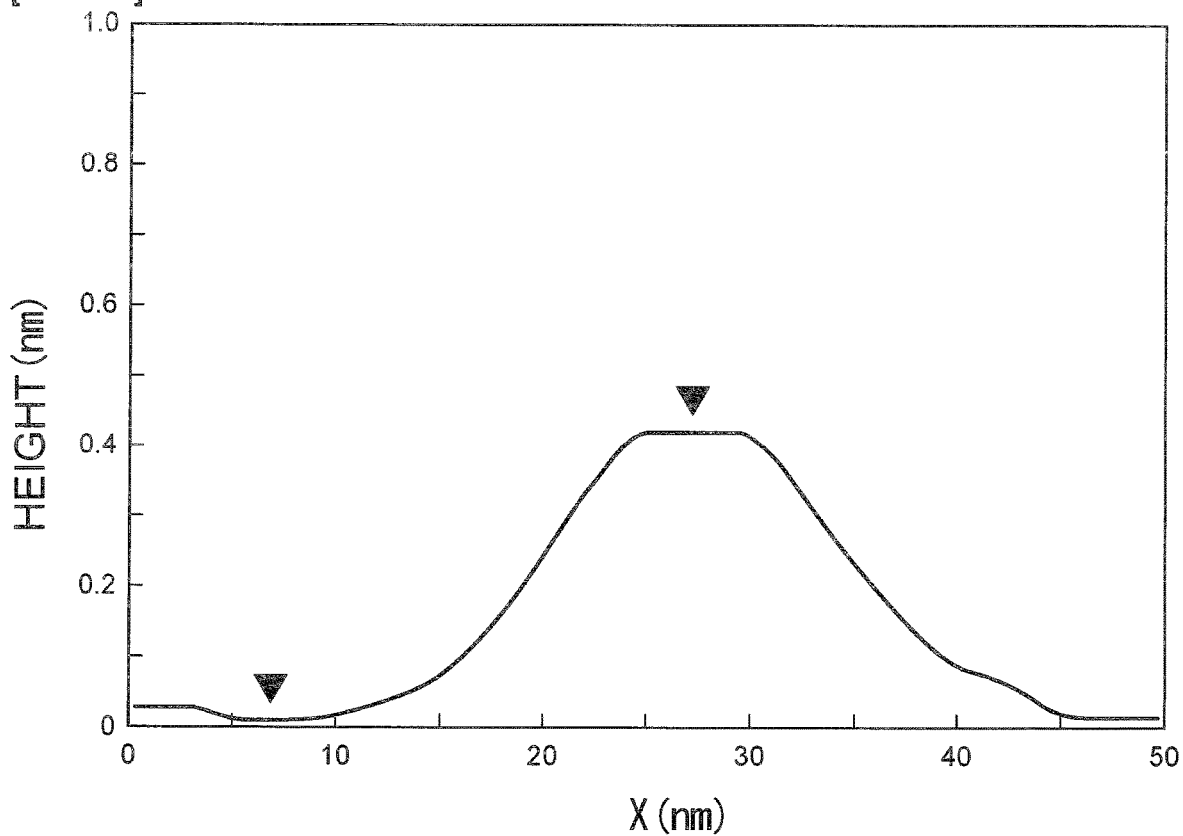

[FIG. 5]
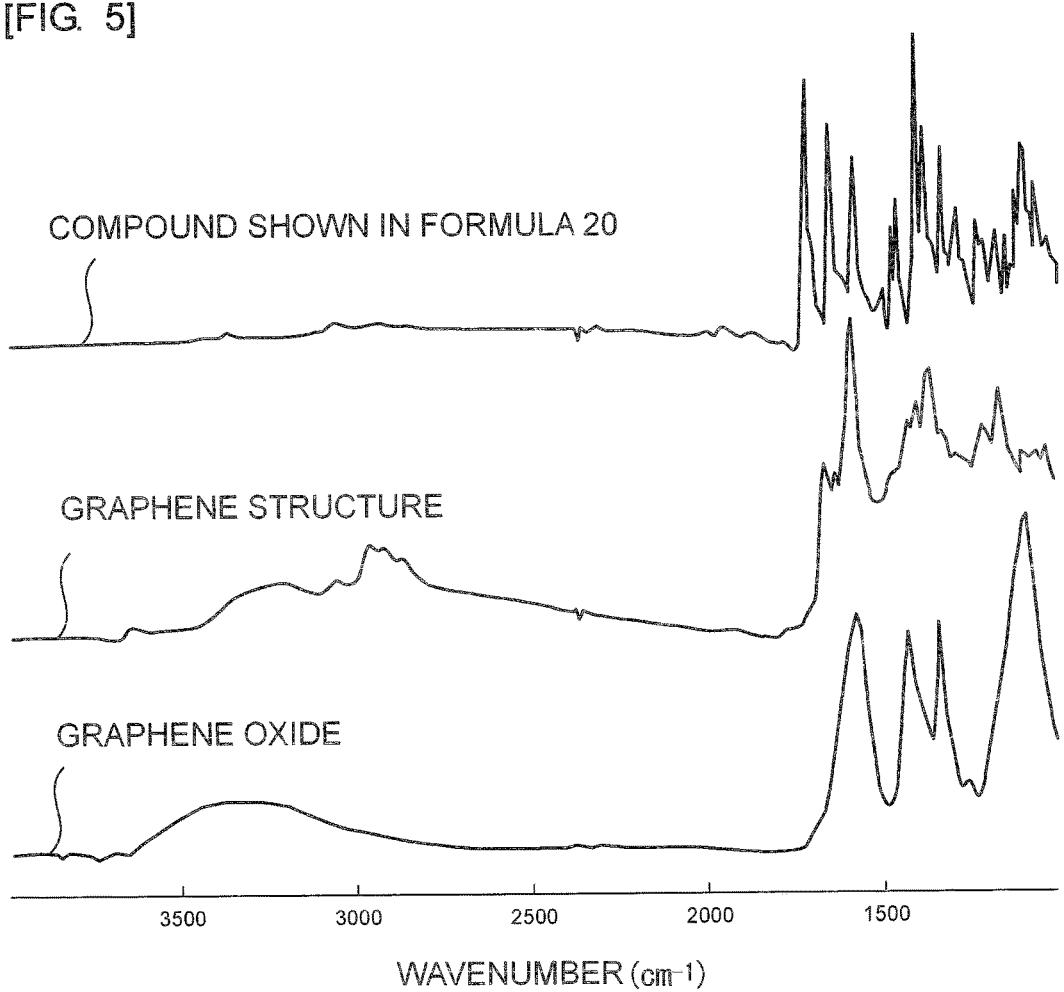
[FIG. 6]
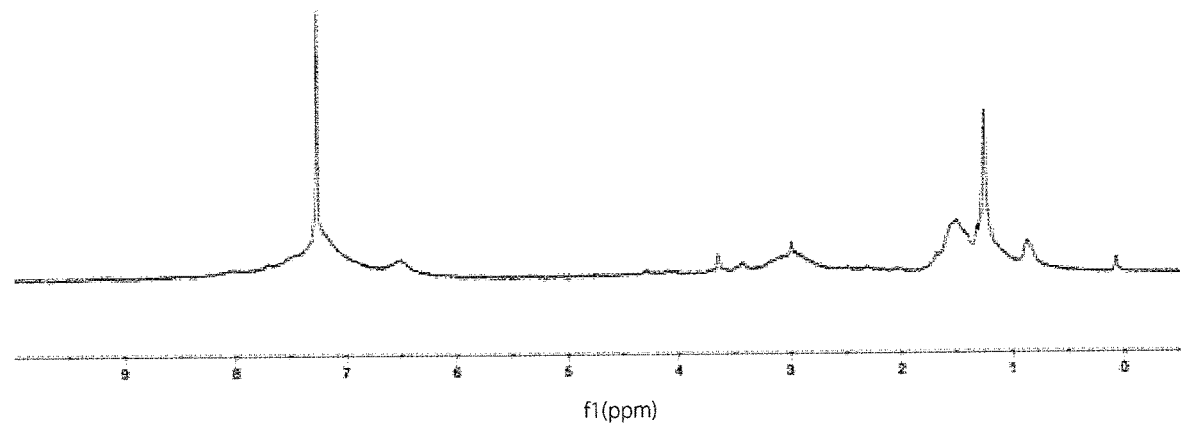

LIGHT-MODULATING MATERIAL, LIGHT-MODULATING FILM, AND LIGHT-MODULATING LAMINATE

TECHNICAL FIELD

The present invention relates to an electrochromic light-modulating material useful for controlling the light transmittance of windows of buildings, automobiles, ail-planes, etc., and a light-modulating film and a light modulating laminate using the same.

BACKGROUND ART

Electrochromic light-modulating materials, which are capable of controlling the transmittance of light in a specific wavelength region, block light of specific wavelength, and are thus used for controlling the transmittance or for controlling the color. The light-modulating materials are used in various fields such as interior components, building components, and electronic components.

In recent years, energy-saving type light-modulating materials capable of controlling the transmittance in the infrared region also have attracted attention and various examinations thereof have been made. For example, in order to control the temperature of the interior of automobiles or the like, a laminated glass having a light-modulating film that comprises light-modulating material as an intermediate layer has been proposed. A laminated glass with a light-modulating film and an electrolyte layer sandwiched between a pair of transparent electrode substrates facing each other has been proposed. It is believed that the transmittance of the laminated glass can be thereby controlled.

For example, Patent Literature 1 and Patent Literature 2 each disclose a light-modulating laminate comprising a three-layer laminate consisting of an inorganic oxide-containing electrochromic layer, an ion-conducting layer, and an inorganic oxide-containing electrochromic layer that are sequentially laminated so as to be sandwiched between two conductive substrates. Also, Patent Literature 3 and Patent Literature 4 each disclose a light-modulating laminate comprising an organic electrochromic material-containing electrochromic layer and an electrolyte layer that are sandwiched between a pair of electrode substrates facing each other.

For example, in Patent Literature 5, a polyacetylene compound having a specific structure is described as such an organic electrochromic material. The polyacetylene compound described in Patent Literature 5 allows the transmittance in a wide wavelength region to be controlled by chemical or electrical stimulation, or by physical stimulation such as change in the pressure or temperature.

CITATION LIST

Patent Literature

Patent Literature 1: Japanese Patent Laid-Open No. 2004-062030

Patent Literature 2: Japanese Patent Laid-Open No. 2005-062772

Patent Literature 3: National Publication of International Patent Application No. 2002-526801

Patent Literature 4: National Publication of International Patent Application No. 2004-531770

Patent Literature 5: International Publication No. WO 2007/061061

SUMMARY OF INVENTION

Technical Problem

The polyacetylene compound described in Patent Literature 5, however, transmits infrared light when blocking visible light, which causes the problem of difficulty in use during the hot season of summer. Although many light-modulating materials other than polyacetylene have been examined, the problems of insufficient light-modulating, poor long-term stability, and the like remain in any case.

An object of the present invention is to provide a light-modulating material capable of controlling the light transmittance in a wide region from the visible light to the infrared light by voltage application.

Another object of the present invention is to provide a light-modulating film and a light-modulating laminate that comprise the light-modulating material.

Solution to Problem

The light-modulating material of the present invention comprises a graphene-like carbon material having an aspect ratio of 3 or more and 330 or less.

In a specific aspect of the light-modulating material of the present invention, the graphene-like carbon material has a dimension of 1 nm or more and 100 nm or less in the plane direction.

In another specific aspect of the light-modulating material of the present invention, the surface of the graphene-like carbon material is modified with a functional group.

In yet another specific aspect of the light-modulating material of the present invention, the functional group is an organic functional group.

In another specific aspect of the light-modulating material of the present invention, the organic functional group is an amine derivative. The amine derivative means an amino group ($-NH_2$) of which a hydrogen atom is substituted with other component. The components may be aliphatic or aromatic.

In yet another specific aspect of the light-modulating material of the present invention, the organic functional group has an aromatic ring or heterocyclic ring which comprises nitrogen. For example, the organic functional group has a nitrogen-containing aromatic functional group.

In yet another specific aspect of the light-modulating material of the present invention, the organic functional group has a cyclic imide group.

In yet another specific aspect of the light-modulating material of the present invention, the organic functional group comprises two or more carbon-carbon double bonds ($C=C$).

In yet another specific aspect of the light-modulating material of the present invention, the organic functional group comprises one or more benzene rings.

In yet another specific aspect of the light-modulating material of the present invention, the organic functional group comprises at least one selected from the group consisting of a benzyl group, a hexadecyloxy group, a silses group and a polyalkoxybenzyl group.

In yet another specific aspect of the light-modulating material of the present invention, the organic functional group comprises at least one selected from the group consisting of a bulky group having a dendrimer selected from the group consisting of 3,5-bis(benzyloxy)benzyl, 3,5-bis(3,5-bis(benzyloxy)benzyloxy)benzyl and 3,5-bis(3,5-bis(3,5-bis(benzyloxy)benzyloxy)benzyloxy)benzyl, 3,4,5-tri(hexadecyloxy)benzyl and polyhedral oligomeric silsesquioxane.

In yet another specific aspect, the light-modulating material of the present invention has an organic functional group represented by the following Formula 14.

[Chemical Formula 1]

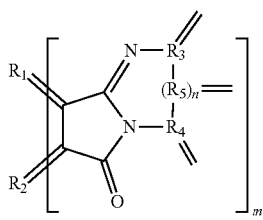

Formula 14 wherein $R_1$ and $R_2$ each are carbon of the aromatic ring in the graphene-like carbon material, $R_3$ to $R_5$ each are carbon of an aromatic ring or a heterocyclic ring in a group having an aromatic ring or a heterocyclic ring, n is 0 or 1, and m is the number of the organic functional groups.

In yet another specific aspect of the light-modulating material of the present invention, the organic functional group is a functional group represented by the following Formula 15.

[Chemical Formula 2]

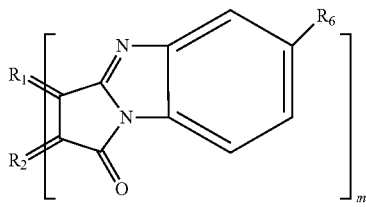

Formula 15 wherein $R_1$ and $R_2$ each are carbon of the aromatic ring in the graphene-like carbon material, $R_6$ is a hydrogen atom, an alkyl group having 1 to 20 carbon atoms, an alkoxy group (having an alkyl group having 1 to 20 carbon atoms), a cyano group, a nitro group, an amino group, or an acylamino group, and m is the number of organic functional groups.

In yet another specific aspect of the light-modulating material of the present invention, the organic functional group is a functional group represented by the following Formula 18.

[Chemical Formula 3]

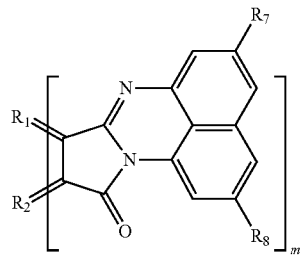

Formula 18 wherein $R_1$ and $R_2$ each are carbon of the aromatic ring in the graphene-like carbon material, $R_7$ and $R_8$ each are a hydrogen atom, an alkyl group having 1 to 20 carbon atoms, an alkoxy group (having an alkyl group having 1 to 20 carbon atoms), a cyano group, a nitro group, an amino group, or an acylamino group, and m is the number of organic functional groups.

In yet another specific aspect of the light-modulating material of the present invention, the modification ratio by the functional groups is 5% or more.

A light-modulating film of the present invention comprises the light-modulating material configured according to the present invention.

A light-modulating laminate of the present invention comprises a first support, a first conductive film disposed on the first support, a light-modulating film disposed on the first conductive film, which is configured according to the present invention, a second conductive film disposed on the light-modulating film, and a second support disposed on the second conductive film.

In a specific aspect of the light-modulating laminate of the present invention, an electrolyte layer is disposed between the light-modulating film and the second conductive film.

In another specific aspect of the light-modulating laminate of the present invention, the first and the second supports are glass substrates.

Advantageous Effects of Invention

According to the present invention, a light-modulating material capable of controlling the light transmittance in a wide region from visible light to infrared light by voltage application can be provided with excellent long-term stability.

Also, according to the present invention, a light-modulating film and a light-modulating laminate which comprise the light-modulating material can be provided.

BRIEF DESCRIPTION OF DRAWINGS

FIG. 1 is a schematic front sectional view of a light-modulating laminate in a first embodiment of the present invention.

FIG. 2 is a diagram showing a reaction scheme for explaining an example of a method for manufacturing graphene-like carbon materials represented by Formula 1 and Formula 7.

FIG. 3 is a diagram showing a reaction scheme for explaining an example of a method for manufacturing a graphene-like carbon material modified by a functional group represented by Formula 14.

FIG. 4 is a graph showing the height profile for explaining a method for measuring the thickness of a graphene-like carbon material.

FIG. 5 is a chart showing the FT-IR spectrum of a graphene-like carbon material obtained in Example 6.

FIG. 6 is a chart showing the $^1$H-NMR spectrum of a graphene-like carbon material obtained in Example 6.

DESCRIPTION OF EMBODIMENTS

With reference to attached drawings, the present invention will be described by way of specific embodiments thereof.

FIG. 1 is a schematic front sectional view of a light-modulating laminate in a first embodiment of the present invention.

A light-modulating laminate 1 has a first and a second support 2A and 2B. The light-modulating laminate 1 has a structure having a light-modulating film 5 sandwiched between the first and second substrates 2A and 2B. In the present embodiment, the first and second supports 2A and 2B are glass substrates. Alternatively, the first and second supports 2A and 2B may be made from an appropriate material having high transparency other than glass.

On the first support 2A, a first conductive film 3A is disposed. As the first conductive film 3A, a transparent electrode made of, for example, ITO may be used. The first support 2A and the first conductive film 3A constitute a first substrate 4A with a conductive film. In the same manner, on the second support 2B, a second conductive film 3B is disposed. The second support 2B and the second conductive layer 3B constitute a second substrate 4B with a conductive film. The second conductive film 3B is made of the material similar to that of the first conductive film 3A.

On the first conductive film 3A, a light-modulating film 5 is disposed. On the light-modulating film 5, an electrolyte layer 6 is disposed. More specifically, on the light-modulating film 5, a supporting component 7 is disposed to surround the electrolyte layer 6. On the supporting component 7, the second substrate 4B with a conductive film is disposed such that the electrolyte layer 6 is sealed.

In the second substrate 4B with a conductive film, the second conductive layer 3B is located on the side of the supporting component 7 and the electrode layer 6. The first and second conductive films 3A and 3B are opposed electrodes of the light-modulating laminate 1.

In a space surrounded by the light-modulating film 5, the second conductive film 3B, and the supporting component 7, an electrolyte solution is enclosed. The electrolyte solution is not specifically limited, and, for example, an electrolyte solution that includes $LiPF_6$ or the like in a solvent such as ethylene carbonate (EC) or dimethyl carbonate (DMC) can be used. The electrolyte layer 6 is thereby provided.

Applying a voltage to the light-modulating laminate 1 configured as described above changes the light transmittance at each wavelength. The electrolyte layer 6 is not necessarily provided. Nevertheless, when the electrolyte layer 6 is provided as in the present embodiment, the light transmittance can be effectively changed.

The details of the light-modulating film 5 and the light-modulating material comprised in the light-modulating film 5 will be described below.

The light modulating material in the light-modulating film 5 comprises a graphene-like carbon material. As the graphene-like carbon material, for example, a graphene or a graphene laminate can be used. Note that the graphene laminate is a laminate of graphene sheets. Preferably, the graphene laminate is one which is obtained by exfoliation of graphite such as exfoliated graphite. The number of the laminated graphene sheets in a graphene laminate is preferably two or more and 30 or less, more preferably three or more and 20 or less, though not particularly limited. The graphene-like carbon material may be one which is oxidized such as a graphene oxide or a graphene oxide laminate. The graphene-like carbon material is, for example, in a sheet form or in a ribbon shape elongated in the plane direction.

The light-modulating material of the present embodiment is an electrochromic light-modulating material. Preferably, the surface of the graphene-like carbon material is modified by a functional group. Preferably, the graphene structure is thereby constructed. Since graphene or the like for use in a graphene-like carbon material has excellent chemical stability, the light-modulating material and the light-modulating film 5 comprising the same are excellent in long-term stability.

Preferably, the functional group comprises a benzyl group, a hexadecyloxy group, a silses group, or a polyalkoxy benzyl group, though not particularly limited thereto. These may be used singly or in combination of two or more. Examples of such a functional group include at least one organic functional group selected from the group consisting of a bulky group having a dendrimer selected from the group consisting of 3,5-bis(benzyloxy)benzyl, 3,5-bis(3,5-bis(benzyloxy)benzyloxy)benzyl and 3,5-bis(3,5-bis(3,5-bis(benzyloxy)benzyloxy)benzyloxy)benzyl, and 3,4,5-tri(hexadecyloxy)benzyl and polyhedral oligomeric silsesquioxane. Examples of the graphene-like carbon material in a light-modulating material are shown in the following Formula 1. In Formula 1 and the following chemical formulas and drawings, the double bond in the aromatic ring constituting graphene and polycyclic aromatic hydrocarbons may be omitted in some cases.

[Chemical Formula 4]

Formula 1

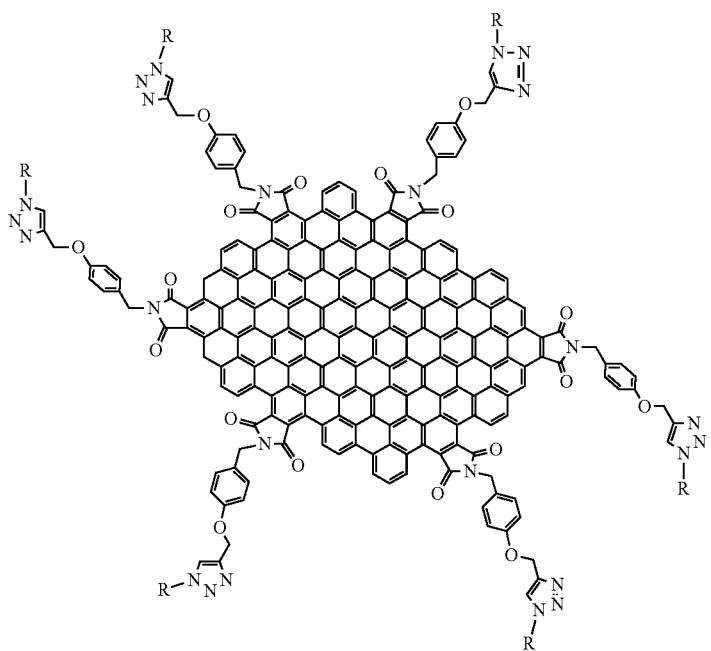

wherein, R represents the organic functional group described above. Each of the dendrimers described above is shown in the following Formulas 2 to 4. Formula 2 represents 3,5-bis(benzyloxy)benzyl. Formula 3 represents 3,5-bis (3,5-bis(benzyloxy)benzyloxy)benzyl. Formula 4 represents 3,5-bis(3,5-bis(3,5-bis(benzyloxy)benzyloxy)benzyloxy)benzyl. The following functional groups represented by Formulas 2 to 4 correspond to R in Formula 1, being connected to the graphene-like carbon material represented by Formula 1 at the position indicated by a broken line.

[Chemical Formula 5]

Formula 2

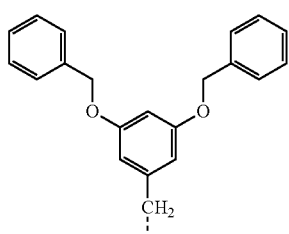

[Chemical Formula 6]

Formula 3

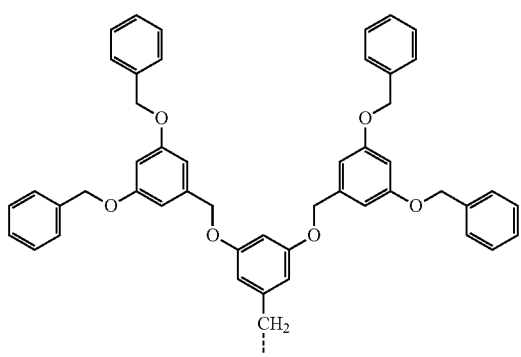

[Chemical Formula 7]

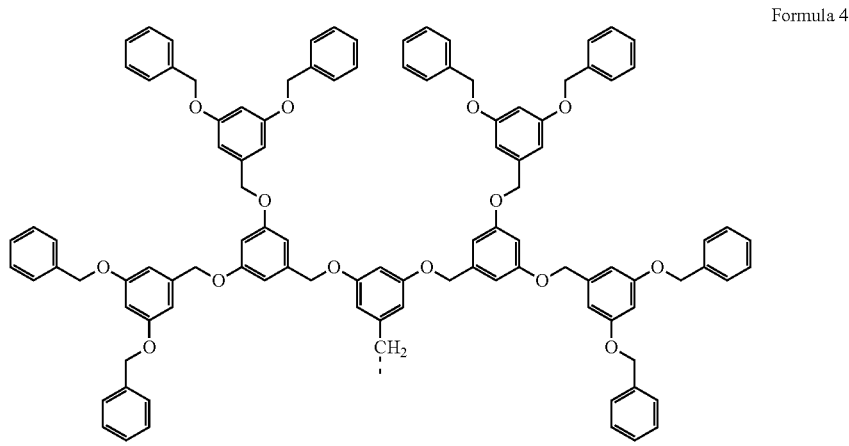

Formula 4

In the following Formula 5, 3,4,5-tri(hexadecyloxy)benzyl is shown. The functional group in the following Formula 5 corresponds to R in Formula 1, being connected to the graphene-like carbon material represented by Formula 1 at the position indicated by a broken line.

[Chemical Formula 8]

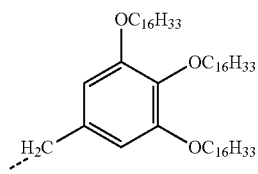

Formula 5

[Chemical Formula 9]

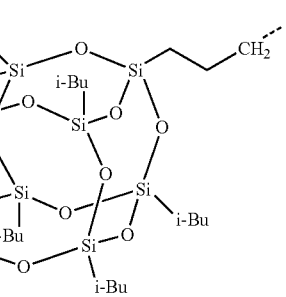

Formula 6

Polyhedral oligomeric silsesquioxane is shown in the following Formula 6. The functional group shown in the following Formula 6 corresponds to R in Formula 1, being connected to the graphene-like carbon material represented by Formula 1 at the position indicated by a broken line.

Alternatively, the end of the functional group of a graphene-like carbon material may be an alkyne as shown in the following Formula 7.

[Chemical Formula 10]

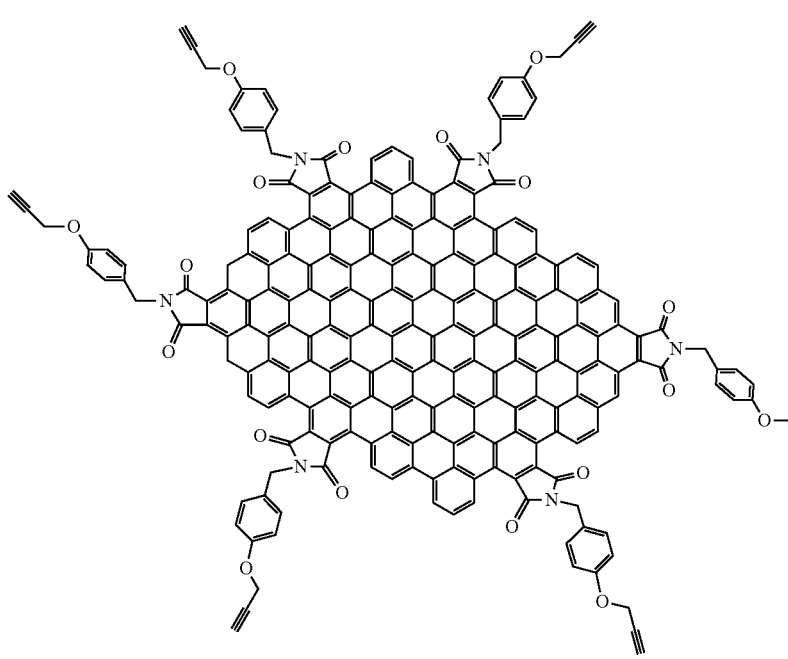

Formula 7

The graphene-like carbon materials shown in the Formula 1 and Formula 7 may be manufactured, for example, by the method disclosed in Japanese Patent Laid-Open No. 2015-134702.

Specifically, the graphene-like carbon materials can be obtained by the reaction scheme shown in FIG. 2. In order to obtain the graphene-like carbon materials represented by Formula 1 and Formula 7, first, graphite shown in Formula 8 in FIG. 2 as an example is added to a mixed solution of concentrated sulfuric acid and nitric acid so as to be oxidized. A carboxyl group as an oxygen-containing functional group is thereby introduced to an end face of graphite, so that the graphene-like carbon material having an oxidized end face as shown in Formula 9 can be obtained.

The graphene-like carbon material shown in Formula 9 is then dissolved in oxalyl chloride, and N,N-dimethylformamide is added to the resulting solution so as to synthesize a carboxylic acid chloride. After removal of the oxalyl chloride, the residue was dissolved in N,N-dimethylformamide, and 4-propynyloxy benzylamine, N,N-dimethyl-4-aminopyridine, and trimethylamine are added to the solution. The carboxylic acid chloride is thereby reacted with 4-propynyloxy benzylamine, so that the graphene-like carbon material shown in Formula 7 can be obtained.

The graphene-like carbon material shown in Formula 7 can be purified by column chromatography with use of a particle-packed column, using a mixed solvent of dichloromethane and ethyl acetate (polar solvent) as the mobile phase.

As the particle-packed column, for example, a column packed with high-purity silica gel (silica gel containing an extremely small amount of metal impurities) can be used (e.g., trade name "Silica gel for chromatography PSQ-100B" manufactured by Fuji Silysia Chemical Ltd.).

Although, in general, graphene-like carbon materials are soluble only in a polar solvent such as water, the graphene-like carbon material represented by Formula 7 can be dissolved in a common organic solvent such as ethyl acetate, acetone, 1,2-dichloroethane, dichloromethane, tetrahydrofuran, and acetonitrile.

By reacting the graphene-like carbon material represented by Formula 9 with 4-propynyloxy benzylamine, a portion of the end face is covered with a 4-propynyloxy benzyl group. It is believed that the moiety of 4-propynyloxy benzyl group prevents self-aggregation by the $\pi$-$\pi$ stacking interaction, achieving a stereoscopic protection of the carbon surface of SP2.

Although the shape of the end face of graphene-like carbon materials can be a type of "armchair" or a type of "zigzag", the graphene-like carbon material of the present invention mainly has an armchair-type end face. As a result, the end face has a five-membered ring phthalimide structure.

The graphene-like carbon material represented by Formula 7 and an acid azide as a nitrogen compound having the R group represented by Formula 2 to Formula 6 (e.g., in the case of Formula 2,3,5-bis(benzyloxy)benzyl azide) are then dissolved in chloroform so as to obtain a solution. To the solution, triphenylphosphine copper bromide (CuBr(PPh$_3$)$_3$) acting as a catalyst is added to perform a Huisgen cycloaddition reaction (cyclization reaction of an alkyne and a nitrogen compound). The graphene-like carbon material represented by the Formula 1 can be thereby obtained.

The graphene-like carbon material shown in Formula 1 can be purified by column chromatography with use of a particle-packed column, using acetone or hexane as the mobile phase. The structural identification of each graphene-like carbon material may be performed by using $^1$H-NMR and IR spectra in comparison with a model compound having a similar structure.

The exchange of electrons between the functional group described above and the graphene-like carbon material allows the electron density to be greatly changed. In response to chemical stimuli, electrical stimuli, or physical stimuli such as pressure and temperature, the light transmittance can be therefore controlled in a wide region from visible light to infrared light. In addition, an excellent long stability can be obtained. Thus, it is preferable that the graphene-like carbon material is modified by a functional group. The functional group is not limited to an organic functional group.

Preferably, the functional group is an amine derivative. The amine derivative means a group formed by substituting a hydrogen atom of an amino group ($-NH_2$) with other component, and the other components may be aliphatic or aromatic. Also, the functional group preferably comprises two or more carbon-carbon double bonds ($C=C$). Furthermore, the functional group preferably comprises one or more benzene rings. The exchange of electrons can be thereby more suitably performed.

Also, the functional group preferably has an aromatic ring or a heterocyclic ring comprising nitrogen. The functional ring may have a cyclic imide group.

Examples of the graphene-like carbon material of which the surface is modified with a functional group having a cyclic imide group include the graphene-like carbon material represented by the following Formula 10.

[Chemical Formula 11]

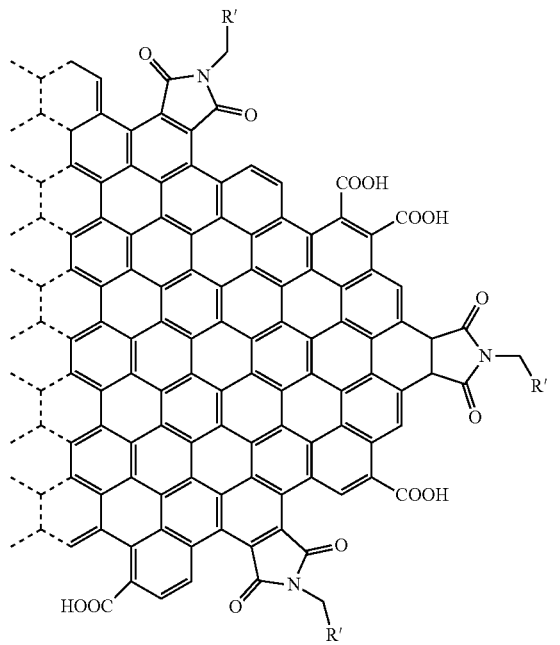

Formula 10 wherein R' is, for example, a group represented by the following Formula 11 or 12.

[Chemical Formula 12]

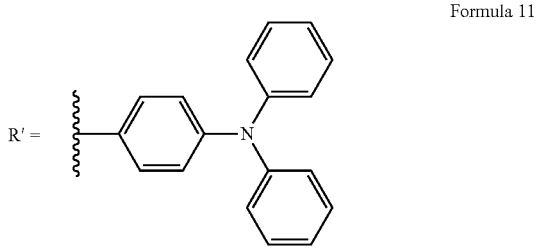

Formula 11

[Chemical Formula 13]

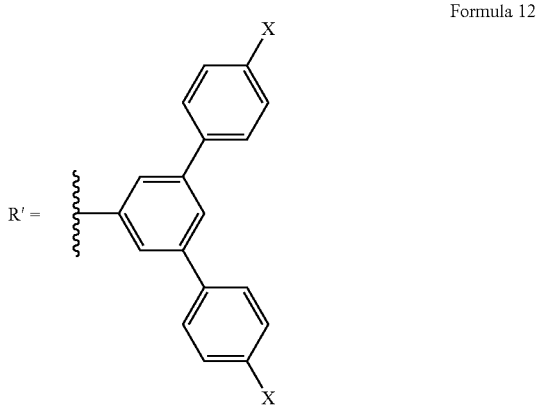

Formula 12 wherein X is a hydrogen atom (H), a methoxy group ($CH_3$), or a trifluoromethyl group ($CF_3$).

The specific examples of the graphene-like carbon material represented by the Formula 10 may be a compound represented by the following Formula 13. In the Formula 13, OMe is a methoxy group.

[Chemical Formula 14]

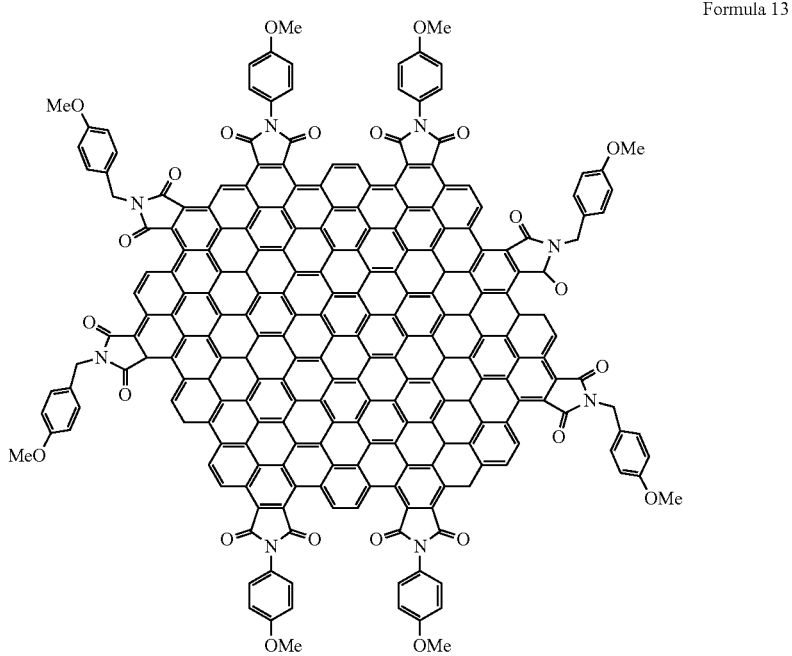

Formula 13

The surface of the polycyclic aromatic hydrocarbon as the graphene-like carbon material may be modified by a functional group represented by the following Formula 14.

[Chemical Formula 15]

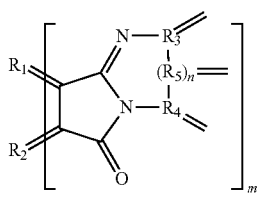

Formula 14 wherein $R_1$ and $R_2$ each are carbon derived from the aromatic ring in a polycyclic aromatic hydrocarbon. $R_1$ and $R_2$ are therefore not included in a functional group, and it means that a polycyclic aromatic hydrocarbon comprising $R_1$ and $R_2$ is provided. $R_3$ to $R_5$ each are carbon derived from an aromatic ring or a heterocyclic ring in a group having an aromatic ring or a heterocyclic ring. In other words, it means that a group having an aromatic ring or a heterocyclic ring comprising $R_3$ to $R_5$ is provided. On this occasion, n is 0 or 1. Accordingly, $R_5$ may be present or absent. m means the number of functional groups. The number m of functional groups is preferably 20 or more and 40 or less, more preferably 30 or more and 50 or less. In the case where the number m of functional group satisfies the lower limit, the density of electrons can be further greatly changed by the exchange of electrons between the functional group and the polycyclic aromatic hydrocarbon. In the case where the number m of functional group satisfies the upper limit, the exchange of electrons hardly occurs and the band gap is further widened.

In the case where n=0, examples of the functional group represented by Formula 14 include a functional group represented by the following Formula 15.

[Chemical Formula 16]

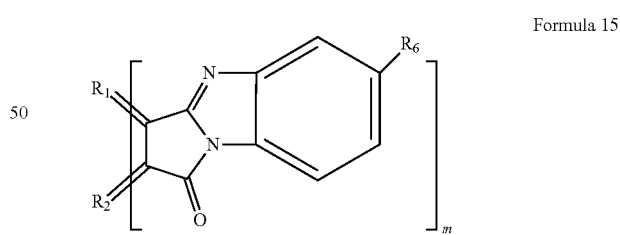

Formula 15 wherein $R_1$ and $R_2$ each are carbon derived from the aromatic ring in a polycyclic aromatic hydrocarbon as described above. $R_6$ is a hydrogen atom, an alkyl group having 1 to 20 carbon atoms, an alkoxy group (having alkyl group having 1 to 20 carbon atoms), a cyano group, a nitro group, an amino group, or an acylamino group. As described above, m is the number of functional groups.

Specifically, in the case where $R_6$ is a hydrogen atom, the functional group is a [d]9H-9-oxo-benzo[4,5]imidazo[2,1-a]pyrro group. Specifically, the graphene-like carbon material is represented by the following Formula 16.

[Chemical Formula 17]

Formula 16

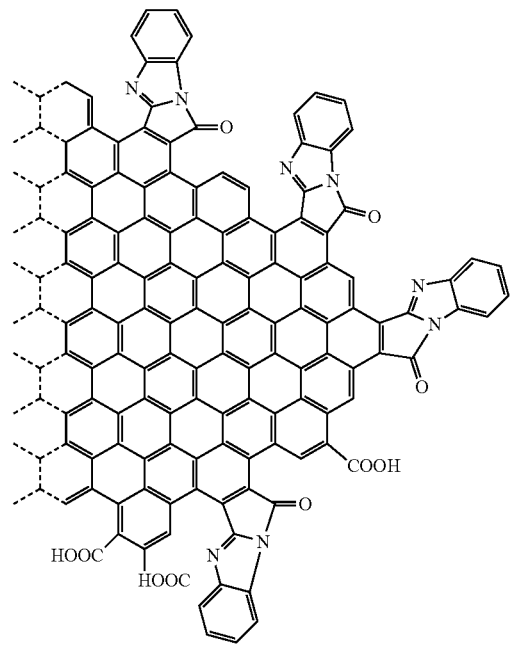

In the case where R₆ is a methoxy group (OCH₃), the graphene-like carbon material is represented by the following Formula 17.

[Chemical Formula 18]

Formula 17

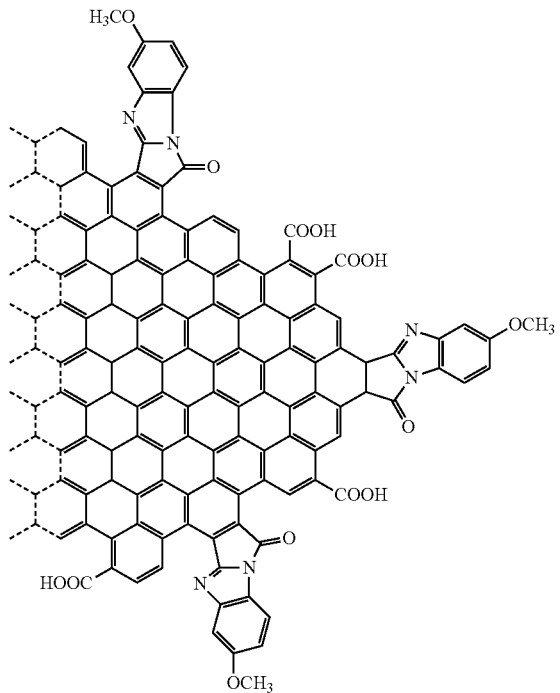

In the case where n=1, examples of the functional group represented by Formula 14 include a functional group represented by the following Formula 18.

[Chemical Formula 19]

Formula 18

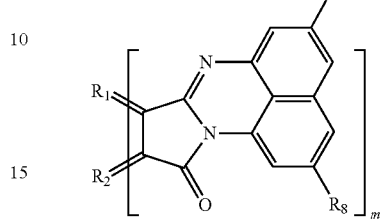

wherein $R_1$ and $R_2$ each are carbon derived from the aromatic ring in a polycyclic aromatic hydrocarbon as described above. Each of $R_7$ and $R_8$ is a hydrogen atom, an alkyl group having 1 to 20 carbon atoms, an alkoxy group (having alkyl group having 1 to 20 carbon atoms), a cyano group, a nitro group, an amino group, or an acylamino group. As described above, m is the number of functional groups.

Specifically, in the case where $R_7$ and $R_8$ are hydrogen atoms, the functional group is a [d]11H-11-oxo-perimidino[2,1-a]pyrro group. In other words, the graphene-like carbon material is represented by the following Formula 19.

[Chemical Formula 20]

Formula 19

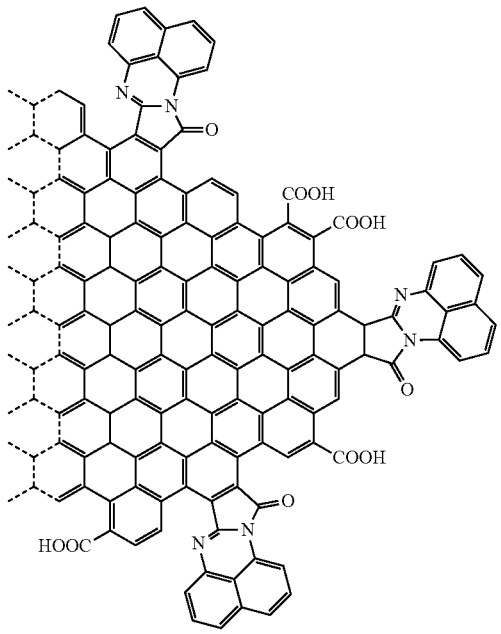

The number of aromatic rings in the polycyclic aromatic hydrocarbon is preferably 2 or more and 10000 or less, more preferably 50 or more and 100 or less.

Examples of the polycyclic aromatic hydrocarbon include pentacene, pentaphene, benzopyrene, perylene, dibenzophenanthrene, picene, coronene, ovalene, anthanthrene, circulene, dicoronylene, helicene, kekulene, zethrene, trinaphthylene, heptaphene, and heptacene. These may be used singly or in combination of two or more.

The polycyclic aromatic hydrocarbon may be the graphene or graphene oxide described above. Alternatively, the polycyclic aromatic hydrocarbon may be an exfoliated graphite or an oxidized exfoliated graphite, which is a laminate of graphene sheets.

The exchange of electrons between the polycyclic aromatic hydrocarbon and the functional group represented by the Formula 14 allows the electron density to be greatly changed. In response to chemical stimuli, electrical stimuli, or physical stimuli such as pressure and temperature, the light transmittance can be therefore controlled in a wide region from visible light to infrared light. In addition excellent long-term stability can be obtained.

The graphene-like carbon material modified by a functional group represented by the Formula 14 can be obtained, for example, according to the reaction scheme shown in FIG. 3. Here, the graphene-like carbon material represented by Formula 17 is described as an example. As shown in FIG. 3, first, a polycyclic aromatic hydrocarbon comprising an aromatic ring having two carboxyl groups is provided. Preferably, the two carboxyl groups are provided at the ortho positions of the aromatic ring. The polycyclic aromatic hydrocarbon comprising an aromatic ring having two carboxyl groups may be obtained, for example, by hydrolysis of the acid anhydride of a polycyclic aromatic hydrocarbon. Alternatively, a graphene oxide or an oxidized exfoliated graphite may be used. The graphene oxide or the oxidized exfoliated graphite may undergo oxidative scission before use. The graphene oxide or the oxidized exfoliated graphite can be manufactured, for example, by a conventionally known manufacturing method such as Hummers method. In this manner, the polycyclic aromatic hydrocarbon comprising an aromatic ring having two carboxyl groups may be a hydrolysate of the acid anhydride of a condensed polycyclic aromatic hydrocarbon having a plurality of condensed aromatic rings. Alternatively, a graphene oxide or an oxidized exfoliated graphite or a product of oxidative scission thereof may be used.

Meanwhile, a compound having one or more aromatic or heterocyclic rings substituted with at least two amino groups is provided. In the case where the compound has a plurality of aromatic or heterocyclic rings, a single aromatic or heterocyclic ring is substituted with least two amino groups, or two or more aromatic or heterocyclic rings are substituted with at least two amino groups as a whole.

Examples of the compound for use include a diamine such as 1,2-diaminobenzene, 4-methoxy-1,2-diaminobenzene, 4-cyano-1,2-diaminobenzene, 4-nitro-1,2-diaminobenzene, naphthalene-1,8-diamine, phenanthrene-9,10-diamine and pyrene-4,5-diamine, 2,4-diaminopyridine, and 3,4-diaminothiophene.

Subsequently, as shown in FIG. 3, a polycyclic aromatic hydrocarbon comprising an aromatic ring having two carboxyl groups is reacted with a compound having one or more aromatic or heterocyclic rings substituted with at least two amino groups. The graphene-like carbon material described above can be thereby obtained. The reaction can be performed in the presence of oxalyl chloride, dimethyl sulfoxide, trimethylamine, or the like, as illustrated in the following Example.

For example, a polycyclic aromatic hydrocarbon comprising an aromatic ring having two carboxyl groups and oxalyl chloride are heated at 60° C. for 4 days. On this occasion, a catalytic amount of N,N-dimethylformamide is added thereto. After removal of the oxalyl chloride, a polycyclic aromatic hydrocarbon comprising an aromatic ring having an acid chlorinated carboxyl group is dissolved in N,N-dimethylformamide, and triethylamine and a catalytic amount of N,N-dimethyl-4-aminopyridine are added thereto. A compound having one or more aromatic or heterocyclic rings substituted with at least two amino groups is then added thereto. The resulting solution is stirred at 80° C. for 4 days. After removal of the solvent, the product is purified with bio-beads with use of tetrahydrofuran as a developing solvent so as to obtain a desired graphene-like carbon material.

The generation of a graphene-like carbon material can be confirmed, for example, by using a Fourier transform infrared spectrophotometer (FT-IR) or a nuclear magnetic resonance (NMR) apparatus.

The modification ratio by functional groups in a graphene-like carbon material is preferably 5% or more, more preferably 10% or more, still more preferably 20% or more. Thereby, the density of electrons can be effectively changed. The modification ratio in the present invention can be determined by the measurement of infrared absorption spectrum (FT-IR). Specifically, the intensity of each of the absorption peaks of the FT-IR spectra of a graphene-like carbon material before and after modification is measured, and the modification ratio is determined from the intensity of the absorption peak corresponding to the carboxyl group (—COOH) (1735 cm$^{-1}$) using the following expression.

$$\text{Modification ratio (\%)} = \{(I_{before} - I_{after})/I_{before}\} \times 100$$

wherein $I_{before}$ is a peak intensity corresponding to the carboxyl group (—COOH) before modification, and $I_{after}$ is a peak intensity corresponding to the carboxyl group (—COOH) after modification.

The dimension of a graphene-like carbon material in the plane direction is preferably 1 nm or more and 100 nm or less, more preferably 2 nm or more and 80 nm or less, still more preferably 3 nm or more and 50 nm or less. With an excessively small dimension in the plane direction, the driving voltage is liable to increase due to an increased band gap. The energy efficiency is therefore liable to decrease. With an excessively large dimension in the plane direction, the change in the density of electrons is liable to decrease. In the case where a graphene or a graphene laminate is used as the graphene-like carbon material, the plane direction is the direction along the principal face of the graphene.

Here, the aspect ratio of a graphene-like carbon material is defined as the dimension in the plane direction/thickness. On this occasion, the aspect ratio of the graphene-like carbon material is 3 or more and 330 or less. The aspect ratio is preferably 5 or more and 300 or less, more preferably 7 or more and 270 or less. With an aspect ratio in the range, the dimension in the plane direction can be further decreased, the change in the density of electrons can be further increased, and the increase in the driving voltage can be further suppressed. The dimension in the plane direction means the maximum dimension in the plane direction, unless otherwise noted.

For a small aspect ratio, use of a graphene laminate is preferred. Preferably, the number of layers of a graphene laminate is 2 or more and 100 or less.

A graphene-like carbon material may have a slender ribbon shape in the plane direction. In this case, the aspect ratio of L e graphene-like carbon material is b/c wherein the dimensions in the plane direction are a and b (a>b) and the thickness is c.

Here, the aspect ratio can be determined, for example, by measurement of the dimensions in the plane direction and the thickness of a graphene-like carbon material with use of an electron microscope or a scanning probe microscope (SPM).

Due to having the configuration described above, the light-modulating laminate 1 is capable of controlling the light transmittance in a wide region from visible light to infrared light by voltage application, with excellent long-term stability.

With reference to the following examples, the present invention will be described in more detail.

(Preparation of Light-Modulating Laminate)

Example 1

According to the reaction scheme shown in FIG. 2, a graphene-like carbon material was synthesized. First, 7.50 g of graphite described in Formula 8 was added to a mixed solution of concentrated sulfuric acid (360 ml) and nitric acid (120 ml). The solution was ultrasonicated for 3 hours and stirred at 120° C. for 24 hours. Subsequently, the mixture was cooled to room temperature (20° C.), diluted with deionized water, and neutralized (pH 5 to 6) with use of potassium carbonate. Subsequently, the solution was filtered through a polytetrafluoroethylene (PTFE) membrane of 0.2 μm. Thereafter, dialysis was performed for several days with use of a dialysis bag (2000 dalton) so as to obtain the graphene-like carbon material shown in Formula 9 (yield: 3.78 g).

Subsequently, to a solution of the graphene-like carbon material shown in Formula 9 (0.40 g) dissolved in oxalyl chloride (5 ml), N,N-dimethylformamide (20 μl) was added. The solution was then ultrasonicated for 3 hours, and stirred at 60° C. for 3 days.

Subsequently, the mixture was cooled to room temperature, and after removal of the oxalyl chloride under reduced pressure, the residue was dissolved in N,N-dimethylformamide (10 ml). To the solution, 4-propynyloxy benzylamine (0.60 g, 3.7 mmol), N,N-dimethyl-4-aminopyridine (4.5 mg, 0.038 mmol), and triethylamine (3 ml) were added.

Subsequently, the solution was stirred at 100° C. for 3 days, and then cooled to room temperature, to which dichlorome bane was added. After removing precipitates by filtration, the solvent was evaporated.

Subsequently, after the residue was dissolved in dichloromethane, the solution was washed with deionized water and concentrated in vacuum. The reaction mixture was purified by column chromatography with use of a column packed with silica gel (trade name "silica gel for chromatography PSQ-100B" manufactured by Fuji Silysia Chemical Ltd.,). (A solution of dichloromethane:ethyl acetate=4:1 was used as the mobile phase). Thereby the graphene-like carbon material shown in Formula 7 was obtained (yield: 0.10 g).

Subsequently, a solution of the graphene-like carbon material shown in Formula 7 (21 mg) and 3,4,5-tri(hexadecyloxy)benzyl azide having a 3,4,5-tri(hexadecyloxy)benzyl group shown in Formula 5 (248 mg, 290 μmol) dissolved in chloroform (5 ml) was prepared. To the solution, 12 mg (13 μmol) of triphenylphosphine copper bromide (CuBr (PPh$_3$)$_3$) was added, and the solution was stirred at 20° C. for 108 hours.

Subsequently, after the solvent was removed in vacuum, the reaction mixture was purified by column chromatography with use of a column packed with silica gel (trade name "silica gel for chromatography PSQ-100B" manufactured by Fuji Silysia Chemical Ltd.). (Acetone was used as the mobile phase). Thereby the graphene-like carbon material shown in Formula 1 was obtained (yield: 37 mg).

The graphene-like carbon material (aspect ratio: 50, dimension in plane direction: 20) modified by the 3,4,5-tri (hexadecyloxy)benzyl group shown in the Formula 5 prepared as described above, which is shown in the Formula 1, was added at a concentration of 1 wt % to toluene. Subsequently, ultrasonic irradiation was performed for 30 minutes so as to disperse the graphene-like carbon material in toluene. Thereby a dispersion liquid was obtained.

Here, two substrates with a conductive film were prepared, each of which having a conductive film of ITO disposed on a glass substrate. To one of the substrate with a conductive film, the dispersion liquid was applied by spin coating. Subsequently, by heating at 85° C. for 1 hour, toluene was removed and the graphene-like carbon material was dried on the substrate with a conductive film. Thereby a light-modulating film disposed on the substrate with a conductive film was obtained.

Subsequently, a supporting component was disposed on the light-modulating film. The other substrate with a conductive filth of the two substrates with a conductive film was then disposed on the supporting component. Into a space surrounded by the light-modulating film, the supporting component, and the substrate with a conductive film, an electrolyte solution (1 mol/L of LiPF$_6$, solvent including EC:DMC=1:2 (volume ratio)) was injected to be sealed. Thereby a light-modulating laminate was obtained.

In Examples and Comparative Examples, the dimension in the plane direction and the aspect ratio of a graphene-like carbon material were measured with use of an atomic force microscope (AFM, trade name "PICOPLUS 5100" manufactured by Agilent Technology Co., Ltd.). Specifically, a dispersion liquid obtained by dispersing 0.002 g of the obtained graphene-like carbon material in 10 ml of dichloromethane (solvent) was thinly applied to the surface of mica and dried. The dried sample was observed with an AFM so as to calculate the dimension in the plane direction from the AFM image. Also, the thickness thereof was calculated from the AFM height profile shown as an example in FIG. 4. X shown in FIG. 4 represents the length in the plane direction. The thickness was determined from the difference between the highest position and the lowest position in the height profile shown in FIG. 4. The dimension in the plane direction and the thickness represent the average values of 50 samples, respectively. The aspect ratio was calculated as the ratio between the dimension in the plane direction and the thickness.

Example 2

A graphene-like carbon material was obtained in the same manner as in Example 1, except that 3,5-bis(3,5-bis(3,5-bis (benzyloxy)benzyloxy)benzyloxy)benzyl azide was used instead of 3,4,5-tri(hexadecyloxy)benzyl azide in Example 1.

The thus obtained graphene-like carbon material (aspect ratio: 320, dimension in plane direction: 98) shown in the Formula 1 modified by 3,5-bis(3,5-bis(3,5-bis(benzyloxy) benzyloxy)benzyloxy)benzyl shown in Formula 4 was used. In every other respect, a light-modulating laminate was prepared in the same manner as in Example 1.

Example 3

A light-modulating laminate was prepared in the same manner as in Example 1, except that a graphene-like carbon material (aspect ratio: 3.5, dimension in plane direction: 1.5 nm) shown in Formula 7 was used instead of the graphene-like carbon material shown in Formula 1 in Example 1. As the graphene-like carbon material shown in Formula 7, one obtained in the middle of the synthesis of the graphene-like carbon material shown in Formula 1 in Example 1 was used.

Example 4

First, graphene oxide was prepared by a method described in literature (J. J. Zhu, P. M. Ajayan, et al., Nano Lett., 2012, 12, 844-849).

Specifically, 1600 ml of a mixed acid (concentrated sulfuric acid:nitric acid=3:1 (volume ratio)) was put into a 5-L three-necked flask, and 6.3 g of powdered graphite (particle diameter<20 μm, manufactured by Sigma-Aldrich) was further fed thereto. Subsequently, a Dimroth condenser was mounted on one of the necks of the three-necked flask, and three-way cocks in a closed state were provided on the remaining necks. With cooling water flowing in this state, the contents were heated at 120° C. with an oil bath while being stirred by a magnetic stirrer under air atmosphere so as to perform a reaction for 24 hours. The reaction product obtained was diluted with 2 L of deionized water. Thereafter, neutralization was performed using sodium carbonate until the pH of the diluted solution reached close to 8, so that a neutralized solution was obtained. The neutralized solution was put into a dialysis bag so as to be dialyzed for 3 days. After removal of neutralized salts and the like, the treatment liquid was dried. Thereby 2.5 g of graphene oxide was obtained.

A graphene-like carbon material shown in the Formula 13 was synthesized from the thus prepared graphene oxide.

Specifically, a stirrer chip was put into a 50-mL eggplant-shaped flask having a three-way cock and baked with a heat gun with argon gas flowing. After cooling, 152 mg of graphene oxide thus prepared was weighed in the eggplant-shaped flask in a dry box. After weighing, to the eggplant-shaped flask taken out from the dry box, 5 mL of oxalyl chloride (manufactured by Sigma-Aldrich) was added by a syringe under argon stream, and 0.1 mL of dried N,N-dimethylformamide (DMF, manufactured by Sigma-Aldrich) was further added thereto. Subsequently, the mixed liquid of graphene oxide, oxalyl chloride, and DMF in the eggplant-shaped flask was sonicated for 3 hours by an ultrasonic treatment apparatus (product No. "US-103", manufactured by SND Co., Ltd.). Thereafter, heating operation with warm water at 60° C. while stirring with a stirrer was performed for 4 days to react the mixed liquid. After the reaction, 5 mL of dried DMF, 5 mL of triethylamine, and 2 mg of 4-methoxybenzylamine were further added to the eggplant-shaped flask, and the reaction was further continued with warm water at 80° C. under an argon atmosphere for 4 days. The resulting reaction product was separated by a separating funnel with a chloroform/saturated NaCl aqueous solution so as to collect the chloroform recovery liquid. After the chloroform recovery liquid was dried with mirabilite for 12 hours, chloroform was removed by an evaporator. The product was purified with bio-beads (Bio-Beads™ S-X1 manufactured by Bio-Rad Laboratories, Inc.) with use of tetrahydrofuran as a developing solvent. Thereby 215 mg of a graphene-like carbon material shown in the Formula 13 was obtained.

A light-modulating laminate was prepared in the same manner as in Example 1, except that the thus obtained graphene-like carbon material shown in the Formula 13 (aspect ratio: 5, dimension in plane direction: 15 nm) was used.

Example 5

First, graphene oxide was prepared by a method described in literature (J. J. Zhu, P. M. Ajayan, et al., Nano Lett., 2012, 12, 844-849).

Specifically, 1600 ml of a mixed acid (concentrated sulfuric acid:nitric acid=3:1 (volume ratio)) was put into a 5-L three-necked flask, and 6.3 g of powdered graphite (particle diameter<20 μm, manufactured by Sigma-Aldrich) was further fed thereto. Subsequently, a Dimroth condenser was mounted on one of the necks of the three-necked flask, and three-way cocks in a closed state were provided on the remaining necks. With cooling water flowing in this state, the contents were heated at 120° C. with an oil bath while being stirred by a magnetic stirrer under air atmosphere so as to perform a reaction for 24 hours. The reaction product obtained was diluted with 2 L of deionized water. Thereafter, neutralization was performed using sodium carbonate until the pH of the diluted solution reached close to 8, so that a neutralized solution was obtained. The neutralized solution was put into a dialysis bag so as to be dialyzed for 3 days. After removal of neutralized salts and the like, the treatment liquid was dried. Thereby 2.5 g of graphene oxide was obtained.

A graphene-like carbon material shown in the Formula 16 was synthesized from the thus prepared graphene oxide.

Specifically, a stirrer chip was put into a 50 mL eggplant-shaped flask having a three-way cock and baked with a heat gun with argon gas flowing. After cooling, 189 mg of graphene oxide thus prepared was weighed in the eggplant-shaped flask in a dry box. After weighing, to the eggplant-shaped flask taken out from the dry box, 5 mL of oxalyl chloride (manufactured by Sigma-Aldrich) was added by a syringe under argon stream, and 0.2 mL of dried N,N-dimethylformamide (DMF, manufactured by Sigma-Aldrich) was further added thereto. Subsequently, the mixed liquid of graphene oxide, oxalyl chloride, and DMF in the eggplant-shaped flask was sonicated for 3 hours by an ultrasonic treatment apparatus (product No. "US-103", manufactured by SND Co., Ltd.). Thereafter, heating operation with warm water at 60° C. while stirring with a stirrer was performed for 3 days. After the reaction, 8 mL of dried pyridine and 451 mg of 1,2-diaminobenzene were further added to the eggplant-shaped flask, and the reaction was further continued with warm water at 80° C. under an argon atmosphere for 4 days. The resulting reaction product was separated by a separating funnel with a chloroform/saturated NaCl aqueous solution so as to collect the chloroform recovery liquid. After the chloroform recovery liquid was dried with mirabilite for 12 hours, chloroform was removed by an evaporator. The product was purified with bio-beads (Bio-Beads™ S-X1 manufactured by Bio-Rad Laboratories, Inc.) with use of tetrahydrofuran as a developing solvent, so that 111 mg of a graphene-like carbon material shown in the Formula 16 was obtained.

A light-modulating laminate was prepared in the same manner as in Example 1, except that the thus obtained graphene-like carbon material shown in Formula 16 (aspect ratio: 20, dimension in plane direction: 45 nm) was used.

Example 6

Similarly, in Example 6, graphene oxide was prepared in the same manner as in Example 5.

A graphene-like carbon material shown in the Formula 19 was synthesized from the thus prepared graphene oxide.

Specifically, a stirrer chip was put into a 50 mL eggplant-shaped flask having a three-way cock and baked with a heat gun with argon gas flowing. After cooling, 159 mg of graphene oxide prepared in the same way as in Example 1 was weighed in the eggplant-shaped flask in a dry box. After weighing, to the eggplant-shaped flask taken out from the dry box, 6 mL of oxalyl chloride (manufactured by Sigma-Aldrich) was added by a syringe under argon stream, and 0.2 mL of dried N,N-dimethylformamide (DMF, manufactured by Sigma-Aldrich) was further added thereto. Subsequently, the mixed liquid of graphene oxide, oxalyl chloride, and DMF in the eggplant-shaped flask was sonicated for 3 hours by an ultrasonic treatment apparatus (product No. "US-103", manufactured by SND Co., Ltd.). Thereafter, heating operation with warm water at 60° C. while stirring with a stirrer was performed for 4 days. After the reaction, oxalyl chloride was removed. Then, 10 mL of dried DMF, 4 mL of triethylamine, and 457 mg of naphthalene-1,8-diamine were added to the eggplant-shaped flask, and the reaction was further continued with warm water at 80° C. under an argon atmosphere for 4 days. The resulting reaction product was separated by a separating funnel with a chloroform/saturated NaCl aqueous solution so as to collect the chloroform recovery liquid. After the chloroform recovery liquid was dried with mirabilite for 12 hours, chloroform was removed by an evaporator. The product was purified with bio-beads (Bio-Beads™ S-X1 manufactured by Bio-Rad Laboratories, Inc.) with use of tetrahydrofuran as a developing solvent, so that 162 mg of a graphene-like carbon material was obtained.

FIG. 5 is a chart showing the FT-IR spectrum of the graphene-like carbon material obtained in Example 6. In FIG. 5, the FT-IR spectra of a compound shown in the following Formula 20 and an unmodified graphene oxide are also shown for comparison.

[Chemical Formula 21]

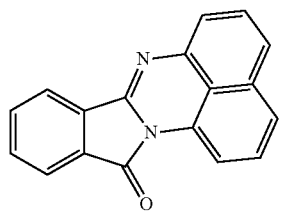

Formula 20

As shown in FIG. 5, shoulder peaks were observed near 1600 to 1700 cm$^{-1}$ for the obtained graphene-like carbon material in addition to the peaks derived from graphene oxide. The shoulder peaks are present at approximately the same position as the peaks of the compound shown in Formula 20, and the peaks are not observed for an unmodified graphene oxide. It was, therefore, confirmed that the same substituent as the compound shown in Formula 20 was introduced into the obtained graphene-like carbon material.

FIG. 6 is a chart showing the $^1$H-NMR spectrum of a graphene-like carbon material obtained in Example 6. As shown in FIG. 6, signals derived from an aromatic ring were observed near 6.5 ppm to 8.0 ppm for the observed $^1$H-NMR spectrum.

From FIGS. 5 and 6, it was therefore confirmed that the graphene-like carbon material shown in the Formula 19 was produced.

A light-modulating laminate was prepared by the same method as in Example 1, except that the thus obtained graphene-like carbon material shown in Formula 19 (aspect ratio: 200, dimension in plane direction: 60 nm) was used.

Comparative Example 1

Using ultrasonic waves, 100 mg of graphene oxide (Ni-SiNa Materials, Exfoliated GO) was dispersed in 70 ml of N,N-dimethylformamide (DMF). In addition, the dispersion was treated at 200° C. for 24 hours in an autoclave container having an internal cylinder of polytetrafluoroethylene, so that a graphene-like carbon material having an aspect ratio of 340 and a dimension in the plane direction of 115 nm was obtained. For other points, a light-modulating laminate was prepared by the same method as in Example 1.

Comparative Example 2

In 10 ml of decahydronaphthalene, 0.005 g of 3,4,9,10-perylenetetracarboxylic diimide (manufactured by Tokyo Chemical Industry Co., Ltd.) was dissolved, and the solution was deposited on an ITO glass by spin coating. The deposited film was heated at 150° C. for 1 hour. By AFM measurement of the film, it was confirmed that the film was made of a graphene-like carbon material having an aspect ratio of 2 and a dimension in the plane direction of 0.7.

(Evaluation on Electrochromic Properties)

A DC voltage of 3 V was applied to a light-modulating laminate so as to evaluate the change in the light transmittance. The change in the light transmittance was measured by a spectrometer manufactured by JASCO Corporation (model number: V-670). In addition, the change in color was inspected by visual observation.

(Evaluation Results)

In Example 1, the light transmittance decreased over the whole region of visible light and an infrared region after voltage application. In particular, the light transmittance was greatly changed from 80% before voltage application to 55% after voltage application near 500 nm. The difference in the light transmittance was 25% in Example 1.

Also in Example 2, the light transmittance decreased over the whole region of visible light and an infrared region after voltage application. In particular, the light transmittance was greatly changed from 79% before voltage application to 60% after voltage application near 500 nm. The difference in the light transmittance was 19% in Example 2.

In Examples 1 and 2, the change in color was confirmed by visual observation. More specifically, the transparency before voltage application was changed to a thick brown color after voltage application.

The electrochromic properties of the light-modulating laminates obtained in Examples 3 to 6 and Comparative Examples 1 to 2 were also evaluated in the same manner. In Examples 3 to 6, it was confirmed that the light transmittance can be controlled over the whole region of visible light and an infrared region after voltage application as in Examples 1 and 2. In particular, the results on the difference in light transmittance (%) at a wavelength of 500 nm and the change in color (visual observation) before and after voltage application are described in the following Table 1. In the evaluation on the change in color (visual observation) in Table 1, "good" indicates that the transparency before voltage application changed into a thick brown color after voltage application. On the other hand, "poor" indicates that the change in color was not observed.

TABLE 1

| | Graphene-like carbon material | | | Evaluation on electrochromic properties | |
|---|---|---|---|---|---|
| | Aspect ratio | Dimension in plane direction (nm) | Structural formula of graphene-like carbon material | Difference in transmittance at wavelength of 500 nm (%) | Change in color before and after voltage application (visual observation) |
| Ex. 1 | 50 | 20 | Formula 1 (modified with R in Formula 5) | 25 | Good |
| Ex. 2 | 320 | 98 | Formula 1 (modified with R in Formula 4) | 19 | Good |
| Ex. 3 | 3.5 | 1.5 | Formula 7 | 30 | Good |
| Ex. 4 | 5 | 15 | Formula 13 | 45 | Good |
| Ex. 5 | 20 | 45 | Formula 16 | 36 | Good |
| Ex. 6 | 200 | 60 | Formula 19 | 25 | Good |
| Comp. Ex. 1 | 340 | 115 | Formula 1 (modified with R in Formula 5) | 1.5 | Poor |
| Comp. Ex. 2 | 2 | 0.7 | Modification with amide group | 0.9 | Poor |

REFERENCE SIGNS LIST

1: LIGHT-MODULATING LAMINATE
2A and 2B: FIRST AND SECOND SUPPORTS
3A and 3B: FIRST AND SECOND CONDUCTIVE FILMS
4A and 4B: FIRST AND SECOND SUBSTRATES WITH CONDUCTIVE FILM
5: LIGHT-MODULATING FILM
6: ELECTROLYTE LAYER
7: SUPPORTING COMPONENT

The invention claimed is:

1. A light-modulating material comprising a graphene-like carbon material having an aspect ratio of 3 or more and 330 or less,
wherein the graphene-like carbon material is a graphene or a laminate of graphene sheets,
wherein a surface of the graphene-like carbon material is modified with an organic functional group represented by the following Formula 14,

[Chemical Formula 1]

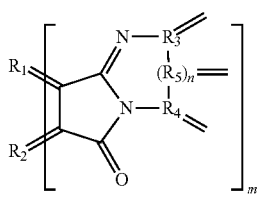

Formula 14 wherein $R_1$ and $R_2$ each are carbon of the aromatic ring in the graphene-like carbon material, $R_1$ to $R_5$ each are carbon of an aromatic ring or a heterocyclic ring in a group having an aromatic ring or a heterocyclic ring, n is 0 or 1, and m is the number of the organic functional groups.

2. The light-modulating material according to claim 1, wherein the graphene-like carbon material has a dimension in a plane direction of 1 nm or more and 100 nm or less.

3. The light-modulating material according to claim 1, wherein the organic functional group is a functional group represented by the following Formula 15,

[Chemical Formula 2]

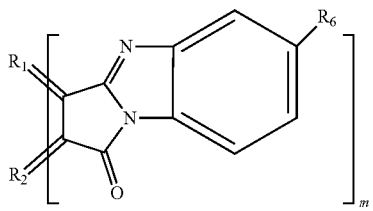

Formula 15 wherein $R_1$ and $R_2$ each are carbon of the aromatic ring in the graphene-like carbon material, $R_6$ is a hydrogen atom, an alkyl group having 1 to 20 carbon atoms, an alkoxy group (having an alkyl group having 1 to 20 carbon atoms), a cyano group, a nitro group, an amino group, or an acylamino group, and m is the number of organic functional groups.

4. The light-modulating material according to claim 1, wherein the organic functional group is a functional group represented by the following Formula 18,

[Chemical Formula 3]

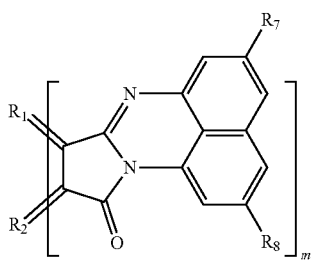

Formula 18 wherein $R_1$ and $R_2$ each are carbon of the aromatic ring in the graphene-like carbon material, $R_7$ and $R_8$ each are a hydrogen atom, an alkyl group having 1 to 20 carbon atoms, an alkoxy group (having an alkyl group having 1 to 20 carbon atoms), a cyano group, a nitro group, an amino group, or an acylamino group, and m is the number of organic functional groups.

5. The light-modulating material according to claim 1, wherein the modification ratio by the functional groups is 5% or more.

6. A light-modulating film comprising the light-modulating material according to claim 1.

7. A light-modulating laminate comprising:
a first support,
a first conductive film disposed on the first support,
the light-modulating film according to claim 6 disposed on the first conductive film,
a second conductive film disposed on the light-modulating film, and
a second support disposed on the second conductive film.

8. The light-modulating laminate according to claim 7, having an electrolyte layer disposed between the light-modulating film and the second conductive film.

9. The light-modulating laminate according to claim 7, wherein the first and the second supports are glass substrates.

* * * * *